United States Patent Office 3,753,960
Patented Aug. 21, 1973

3,753,960
PREPARATION OF GEL-FREE EPDM BASED ON ETHYLIDENE NORBORNENE
Eliot K. Easterbrook, Naugatuck, and Ajab S. Malik, New Haven, Conn., assignors to Uniroyal, Inc.
No Drawing. Filed Aug. 31, 1967, Ser. No. 664,643
Int. Cl. C08f 15/40
U.S. Cl. 260—80.78
7 Claims

ABSTRACT OF THE DISCLOSURE

Build-up of gel, branching, cross-linking, and undesirable increases in Mooney viscosity, by post-polymerization side reactions in EPDM rubbed based on ethylidene norbornene, is prevented by adding to the polymerization reaction mixture, at the conclusion of the polymerization, a Lewis base such as polypropylene glycol or monoethanolamine.

BACKGROUND OF THE INVENTION (1) Field of the invention

This invention relates to a method of preventing gel build-up, by undesirable post-polymerization side reactions, in an EPDM polymerization product in which the diene is ethylidene norbornene. The invention further relates to gel-free ethylidene norbornene-based EPDM containing a Lewis base.

(2) Description of the prior art

U.S. Pat. 3,093,620, Gladding et al., June 11, 1963, discloses using a low molecular weight alcohol to deactivate the catalyst, and a phenol is used as an antioxidant, in the preparation of EPDM based on certain alkenyl norbornenes.

SUMMARY OF THE INVENTION

In accordance with the invention, a Lewis based is added, at the conclusion of the polymerization and prior to recovery of the polymer, to the "cement" or polymer solution resulting from the copolymerization of ethylene, a different alpha-olefin such as propylene, and ethylidene norbornene, in a volatile organic solvent with the aid of an anionic coordination-type catalyst.

In preparing certain kinds of sulfur vulcanizable unsaturated EPDM rubbery copolymers, notably ethylene-propylene-dicyclopentadiene terpolymer, using a catalyst based on a vanadium compound and an alkyl aluminum halide for example, very little if any active catalyst remains at the conclusion of the polymerization and it is found to be unnecessary to use a "shortstop" (e.g., water, alcohol) to terminate the polymerization reaction and to prevent undesirable post-polymerization side reactions. In fact, in manufacturing dicyclopentadiene type of EPDM, satisfactory results have been obtained by simply adding a small portion of a stabilizer, or none at all, to the cement at the end of the polymerization.

However, if it is attempted to manufacture EPDM in which the diene is ethylidene norbornene in the same way it is unfortunately found that gel is formed in the polymer. Undesirable post-polymerization side reactions, involving branching, cross-linking and increases in Mooney viscosity, take place, and as a consequence the polymer is difficult to process into useful articles.

In accordance with the invention, it has surprisingly been found that the addition of a small amount of a Lewis base to the polymerization reaction mixture of EPDM based on ethylidene norbornene, at the conclusion of the polymerization, forestalls the described undesirable changes, and a unique and highly useful gel-free rubber is recoverable from the reaction mixture.

Description of the Preferred embodiments

The polymerization reaction mixture with which the invention is practiced is that resulting from the terpolymerization of ethylene, another alpha-olefin having the structure R—CH=CH$_2$ wherein R is a C$_1$–C$_8$ alkyl radical (e.g., propylene, pentene-1, etc.), and 5-ethylidene-2-norbornene, which has the structure

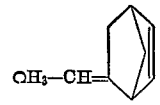

to make an amorphous, rubbery, sulfur-vulcanizable terpolymer. The ability of such EPDM to be vulcanized with sulfur is a consequence of the unsaturation conferred upon the rubber by the non-conjugated diene, ethylidene norbornene. Only a relatively small amount of such diene need be used; usually the ethylidene norbornene content of the terpolymer is from about 1% or less to about 20% or more, by weight. The ratio of ethylene:propylene or other alpha-olefin is usually between 40:60 and 75:25, by weight in the polymer.

The terpolymerization is conveniently carried out in an inert volatile organic solvent medium, such as an aliphatic hydrocarbon solvent (e.g., n-hexane) or an aromatic solvent (e.g., benzene) or a halogenated solvent such as perchloroethylene or carbon tetrachloride. The terpolymerization is catalyzed by the conventional anionic coordination type catalysts such as are obtained by combining a transition metal compound, usually a vanadium salt, with an organoaluminum compound, frequently an alkylaluminum halide.

Preferred is the soluble catalyst (soluble in hydrocarbons, e.g., hexane) based on such vanadium salts as vanadium oxytrichloride or vanadium tetrachloride with an alkylaluminum halide such as ethylaluminum sesquichloride, in which the Al:V mole ratio is at least 5:1, preferably 10:1 or more. The copolymerization may be carried out continuously if desired, by feeding the polymerization ingredients continuously or incrementally to a reaction vessel or a plurality of reaction vessels in series, while withdrawing a product stream (called a cement) containing solvent, dissolved rubbery terpolymer, unreacted monomers and catalyst residue. A suitable method is disclosed in copending U.S. patent application Ser. No. 383,329, Paige and Di Palma, filed July 17, 1964, now U.S. Pat. 3,341,503, issued Sept. 12, 1967, the disclosure of which is hereby incorporated herein by reference. The invention is concerned with the treatment of the polymer cement at the conclusion of the polymerization, to prevent undesirable post-polymerization changes in the polymer during recovery. These undesirable post-polymerization changes include the formation of gel, cross-linking and undesirable increases in Mooney viscosity. These untoward changes take place while the polymer is being recovered from the solution (for example, by the method disclosed in copending U.S. patent application Ser. No. 383,346, filed July 17, 1964, the disclosure of which is hereby incorporated herein by reference) and dried. The gel-containing polymer in which these unwanted changes have taken place is difficult to process or compound, and unsatisfactory results are obtained if it is attempted to make manufactured articles, such as pneumatic tires, from the product.

In accordance with the invention it is found that the addition, to the ethylene-propylene-ethylidene norbornene terpolymer cement, of a Lewis base prevents the described gel build-up and accompanying undesired changes. Lewis bases having a boiling point of at least 150° C. are particularly suitable for use in the invention. The amount of Lewis base employed is usually from about ½ or less to 2% or more, on the weight of the polymer.

The unexpected nature of the result of the use of Lewis bases as additives, in accordance with the invention, is emphasized by that fact that in the manufacture of terpolymers with non-conjugated dienes other than ethylidene norbornene, notably when the non-conjugated diene is dicyclopentadiene, use of an additive which prevents post-polymerization side reactions is not necessary. But certain types of shortstops (water, alcohol) are often times employed with ionic-coordination polymerizations to terminate the polymerization reaction. The average lifetimes of active catalysts for the preparation of EPDM's is relatively short (about 1 to 2 min.). When the residence time of a polymerization cement in a reactor is of the order of 15 minutes or longer, very little active catalyst would be found exiting the reactor. As a consequence, we have found it unnecessary to employ a shortstop during the manufacture of dicyclopentadiene-type EPDM. This has been demonstrated in the pilot plant where only stabilizer is added at the end of the run and in the plant where only a small portion of the stabilizer or none at all is added to the cement at the end of the polymerization.

In the case of copolymerization employing ethylidene norbornene, however, we have found that addition of stabilizer alone is nowhere near adequate. Without addition of some sort of material which prevents post-polymerization side reactions, the resulting polymer will have cross-linked or increased in molecular weight. Although many compounds may stop post-polymerization side reactions, there are two additional requirements that the compounds must have for plant consideration. First, the compound must be of such a nature that it will not be carried over with the recycle solvent and later act as a catalyst poison. Second, the compound must not lead to the evolution of hydrogen chloride as this would result in plant corrosion and possibly catalyst poisoning. Polypropylene glycol and monoethanolamine meet these requirements.

It is believed that various types of postpolymerization reactions are possible with EPDM's. Free radical crosslinking, etc., is minimiized in ordinary practice by employing an inert atmosphere over the reaction mixture and product until polymer stabilizers are added. Furtherpolymerization in ordinary practice is minimized by the fact that the catalyst lifetimes are short and the fact that unreacted ethylene is quickly flashed off (ethylene is a necessary ingredient in order to get polymerization with propylene and diene, using the type of catalysts here described). It is believed that the undesired post-polymerization reaction, which it is an object of the present invention to stop or suppress, is a cationic (Lewis acid) type of reaction. The normal shortstops conventionally employed for stopping the polymerization (alcohols, water, etc.) unless used in excess can actually act as promoters for cationic type reactions (i.e. the polymerization of isobutylene). The presently employed Lewis bases do not. They are not as effective in shortstopping the polymerization reaction as conventional shortstops (alcohols and water). Ethylidene, norbornene contains a double bond more susceptible to attack by Lewis acids than dicyclopentadiene, and it is believed that the need for the invention arises from this fact.

Other Lewis bases may be employed in the invention in place of polypropylene glycol or monoethanolamine. Thus, polyalkylene ether glycols other than polypropylene glycol, such as polyethylene glycol, polybutylene glycol, polytetramethylene glycol, may be employed. Usually the molecular weight of the glycol is 200 or higher (i.e. 3,000). Equivalent materials for purposes of the invention are the analogous polyalkylene thioether glycols (e.g. polyethylene thioether glycol, polypropylene thioether glycol), polyimines, polyamines, polyamides and epoxidized polybutadienes, etc. Solubility in hexane, is preferable, as is a Lewis base functionality of not less than 50% of the sum of Lewis base functionality plus any acidic hydrogen content functionality, that is, for every acidic hydrogen present that would release hydrogen chloride from the catalyst there is a Lewis base functionality present that would accept or coordinate with this acid. Thus, for example, in the Lewis base monoethanolamine, the amine group represents one site of Lewis base functionality while the hydroxyl group represents one site of acidic hydrogen functionality, whereby the Lewis base functionality is equal to the acidic hydrogen functionality. In practice it is best to have a large excess of the Lewis base sites. Thus, for example, in polypropylene ether glycol, the two terminal hydroxyls represent two sites of acidic hydrogen, while the numerous ether linkages constitute Lewis base sits greatly in excess over the number of acidic hydrogen sites.

In practicing the invention, the Lewis base is simply added to the polymer cement at the conclusion of the polymerization reaction. Such addition is made before flashing off unreacted monomers, washing of the cement to remove catalyst residues, and "floccing" (i.e. recovery of the polymer from the cement for example by mixing the cement with superheated water and volatilizing the solvent, with the result that the polymer "flocculates" in the form of solid particles or crumbs).

In a preferred practice the Lewis base chemical is added to the polymer cement directly after the polymerization in a vessel equipped with an agitator or an in-line mixer.

The following example, in which all quantities are expressed by weight, will serve to illustrate the practice of the invention in more detail.

EXAMPLE

To make ethylene-propylene-ethylidene norbornene terpolymer the following recipe may be used:

| | | |
|---|---|---|
| Hexane (n-hexane) | lbs./hr | 50 |
| Propylene | lbs./hr | 6.0 |
| Ethylene | lbs./hr | 3.0 |
| Ethylidene norbornene (5-ethylidene - 2 - norbornene) | lbs./hr | 0.24 |
| Ethylaluminum sesquichloride | lbs./hr | 0.23 |
| $VOCl_3$ | lbs./hr | 0.023 |
| Temperature | ° F | 140 |
| Pressure | lbs. per sq. in | 100 |

This recipe may be varied to get different compositions of ethylene, propylene and ethylidene norbornene in the polymer.

The reaction mixture may be passed continuously through an agitated reaction vessel jacketed for cooling, residence time about 20 minutes.

In a series of runs carried out in this manner, certain of the runs are carried out in accordance with conventional practice, that is, no Lewis base is added to the polymer solution ("cement") thus obtained, at the conclusion of the polymerization. In some of the runs, a conventional "shortstop," butanol, is employed. In other runs in the series the method of the invention is employed, that is, a Lewis base, namely, monoethanolamine or polypropylene glycol of molecular weight 2,000, is added to separate portions of the polymer solution, in amount of 1% of Lewis base based on the weight of the polymer, in a tank equipped with an agitator, at the conclusion of the polymerization.

In each case, unreacted monomers are then flashed off from the polymer solution and may be recycled, and the solution, which contains about 15% polymer, is washed with water to remove catalyst residues.

Thereafter the polymer is recovered by thoroughly dispersing the washed cement (temperature, 150° F.) in an equal weight of superheated water at a temperature of 250° F. The resulting two-phase dispersion (one phase water and the other phase polymer dissolved in hexane) is sprayed with steam (275° F. 30 lbs. per sq. in. gauge)

through a steam jacketed dual spray nozzle (as described in copending application Ser. No. 383,346 referred to previously) into the vapor space of a flock tank (5 lbs. per sq. in. gauge pressure) containing agitated hot water (200° F.). Solvent and any remaining unreacted monomers are thus flashed off and may be recycled. The resulting fine particles of polymer are separated from the slurry formed in water in the tank, and dried.

In those runs in which no Lewis base is added, cross-linking and gelling of the polymer, with a resultant increase in Mooney viscosity during processing of the cement and recovery of the polymer, are observed. Conventional "shortstops" such as water or butanol are not found adequate to prevent these undesired changes. Conventional "shortstops" either would not terminate the post-polymerization reactions or they would contaminate recycle streams, either by themselves or by hydrogen chloride which they would cause to evolve from the catalyst.

In contrast, in the runs in which monoethanolamine or polypropylene glycol is added to the cement at the conclusion of the polymerization, these additives are found to be effective in preventing gel build-up. No gelation is observed during the recovery of the polymer and the Mooney viscosity remains at the desired level. Representative data are given in the table below. In runs D and E, which represent the practice of the invention, 1%, on the weight of the polymer, of monoethanolamine or polypropylene glycol of 2,000 molecular weight is added. In runs A, B and C, which are outside the invention, no Lewis base additive is employed. The table clearly shows the manner in which the invention prevents undesired increase in Mooney viscosity, intrinsic viscosity, and gel content, and retains the solubility of the terpolymer.

TABLE.—EFFECT OF LEWIS BASE ADDITIVE

| Run | A | B | C | D | E |
| --- | --- | --- | --- | --- | --- |
| Additive | No | No | No | [1] Yes | [2] Yes |
| Mooney viscosity | 159 | 152 | 173 | 70 | 67 |
| Intrinsic viscosity (in tetralin 135° C.) | 2.3 | 2.1 | 2.1 | 1.7 | 1.9 |
| Percent gel in hot xylene | 24.2 | 17.0 | 13.9 | Nil | Nil |
| Iodine Number | [3] | [3] | [3] | 11.2 | 9.8 |

[1] 1% of monoethanolamine.
[2] 1% of polypropylene glycol (2,000 molecular weight).
[3] Did not dissolve.

The recovered gel-free ethylene-propylene-ethylidene norbornene terpolymer, containing the Lewis base additive in accordance with the invention, is an unsaturated sulfur-vulcanizable rubber that has good processing and compounding properties, and can be molded or otherwise shaped readily by the methods conventionally used in making elastomeric articles. The polymer is useful for making all or part of a pneumatic tire (e.g., tread, carcass, sidewall) with or without blending with other rubbers (e.g., SBR, polybutadiene, butyl), belts, hose, coated fabric, footwear, gaskets, diaphragms, curing bags, etc.

If desired the polymer may also contain other dienes, such as dicyclopentadiene, in addition to ethylidene norbornene.

Having thus described our invention, what we claim and desire to protect by Letters Patent is:

1. In a method of making unsaturated sulfur-vulcanizable ethylene-propylene-5-ethylidene-2-norbornene terpolymer rubber, containing ethylene and propylene in weight ratio between 40:50 and 75:25 and from 1 and 20% of 5-ethylidene-2-norbornene based on the weight of the terpolymer, wherein the said monomers are dissolved in a volatile organic solvent medium containing an anionic-type coordination catalyst for the terpolymerization of said monomers, and the terpolymer is thereafter recovered from the solution, the improvement comprising adding to the solution, at the conclusion of the terpolymerization and prior to recovery of the terpolymer, from ½ to 2%, based on the weight of the terpolymer, of a Lewis base, whereby gel formation in the terpolymer is prevented, the said Lewis base having a boiling point of at least 150° C. and a Lewis base site functionality at least equal to any acidic hydrogen content, the said Lewis base being selected from the group consisting of polyalkylene ether glycols having a molecular weight of 200–3000, and monoethanolamine.

2. A method as in claim 1 in which the Lewis base is selected from polypropylene glycol and monoethanolamine.

3. In a method of making unsaturated sulfur-vulcanizable ethylene-propylene-5-ethylidene-2-norbornene terpolymer rubber, containing ethylene and propylene in weight ratio between 40:60 and 75:25 and from 1 to 20% of 5-ethylidene-2-norbornene based on the weight of the terpolymer, wherein the said monomers are dissolved in a volatile organic solvent medium containing an anionic-type coordination catalyst for the terpolymerization of said monomers, said catalyst being soluble in the said solvent and being a complex of vanadium oxytrichloride or vanadium tetrachloride with an alkylaluminum halide, the terpolymer is thereafter recovered from the solution and the solvent is recycled to the start of the process, the improvement comprising adding to the solution, at the conclusion of the terpolymerization prior to recovery of the terpolymer, from ½ to 2% based on the weight of the terpolymer, of a Lewis base, as a preservative against gel formation, the said Lewis base having a boiling point of at least 150° C. and a Lewis base site functionality at least equal to any acidic hydrogen content, the said Lewis base being selected from the group consisting of polyalkylene ether glycols having a molecular weight of 200–3000, and monoethanolamine.

4. A method as in claim 3 in which the said solvent is n-hexane.

5. A process for preparing a sulfur-curable ethylene copolymer crude reaction product mixture, resulting from copolymerization of ethylene with an α-olefin having 3–10 carbon atoms and ethylidene norbornene in the presence of a coordination catalyst containing halogen and aluminum, which process consists essentially of admixing the crude reaction product mixture solution with about 0.225–0.9 mole of a Lewis base per gram-atom of aluminum in said mixture.

6. The process of claim 5 in which the copolymer is prepared by polymerizing ethylene, propylene and ethylidene norbornene.

7. The process of claim 6 in which the amount of Lewis base is about 0.45 mole per gram-atom of aluminum.

References Cited
UNITED STATES PATENTS

| 3,151,173 | 9/1964 | Nyce | 260—666 |
| 3,347,944 | 10/1967 | Fritz | 260—666 |
| 3,234,383 | 2/1966 | Barney | 260—80.6 |
| 3,574,176 | 4/1971 | Boozer | 260—80.78 |

MAURICE J. WELSH, Primary Examiner
R. A. WHITE, Assistant Examiner